H. H. NIEMEYER, A. E. LEHMANN & A. SINSKEY.
SLEEPING CAR.
APPLICATION FILED AUG. 26, 1907.
964,540.
Patented July 19, 1910.
5 SHEETS—SHEET 3.
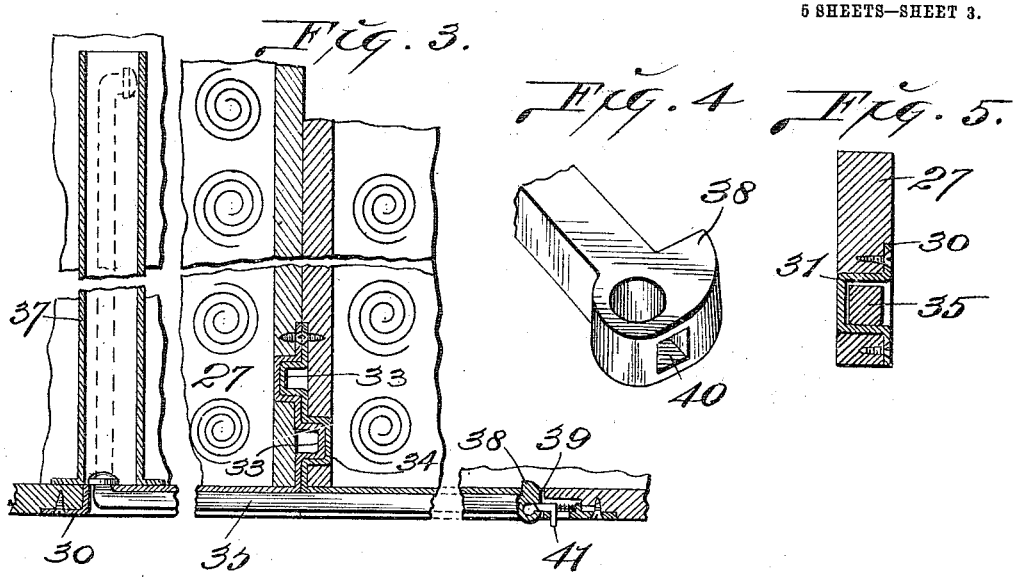
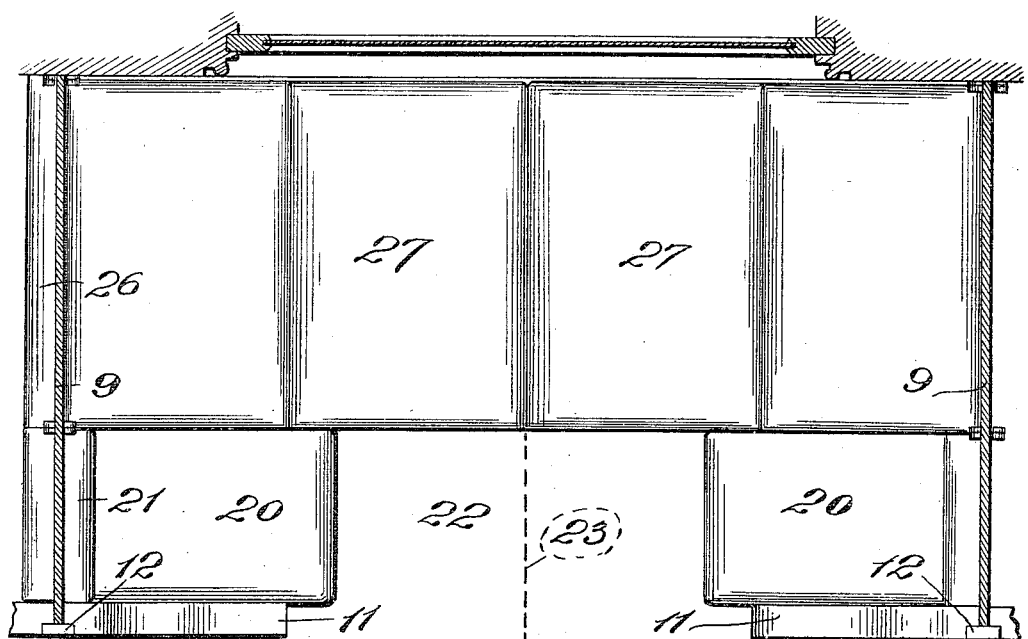

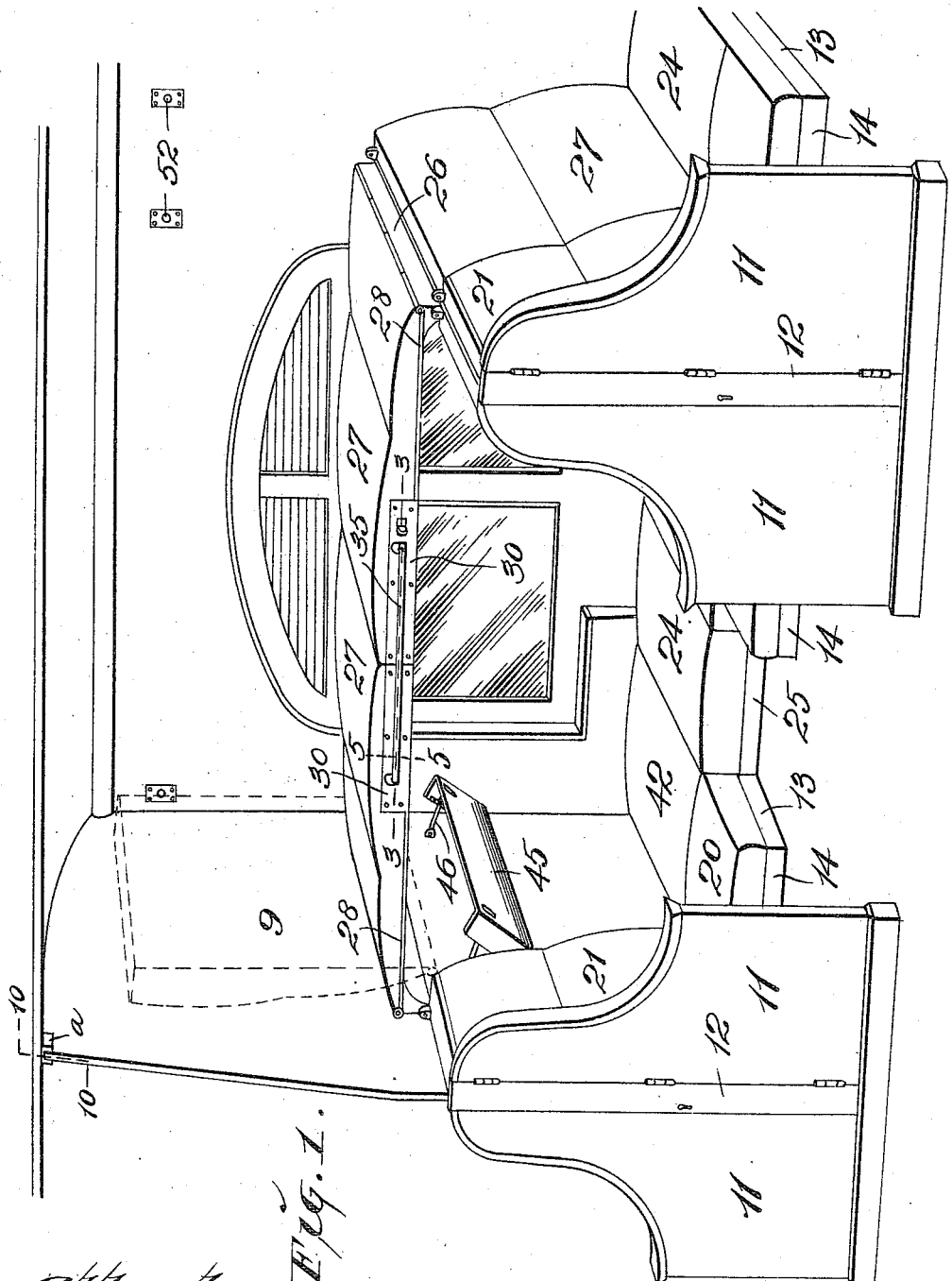

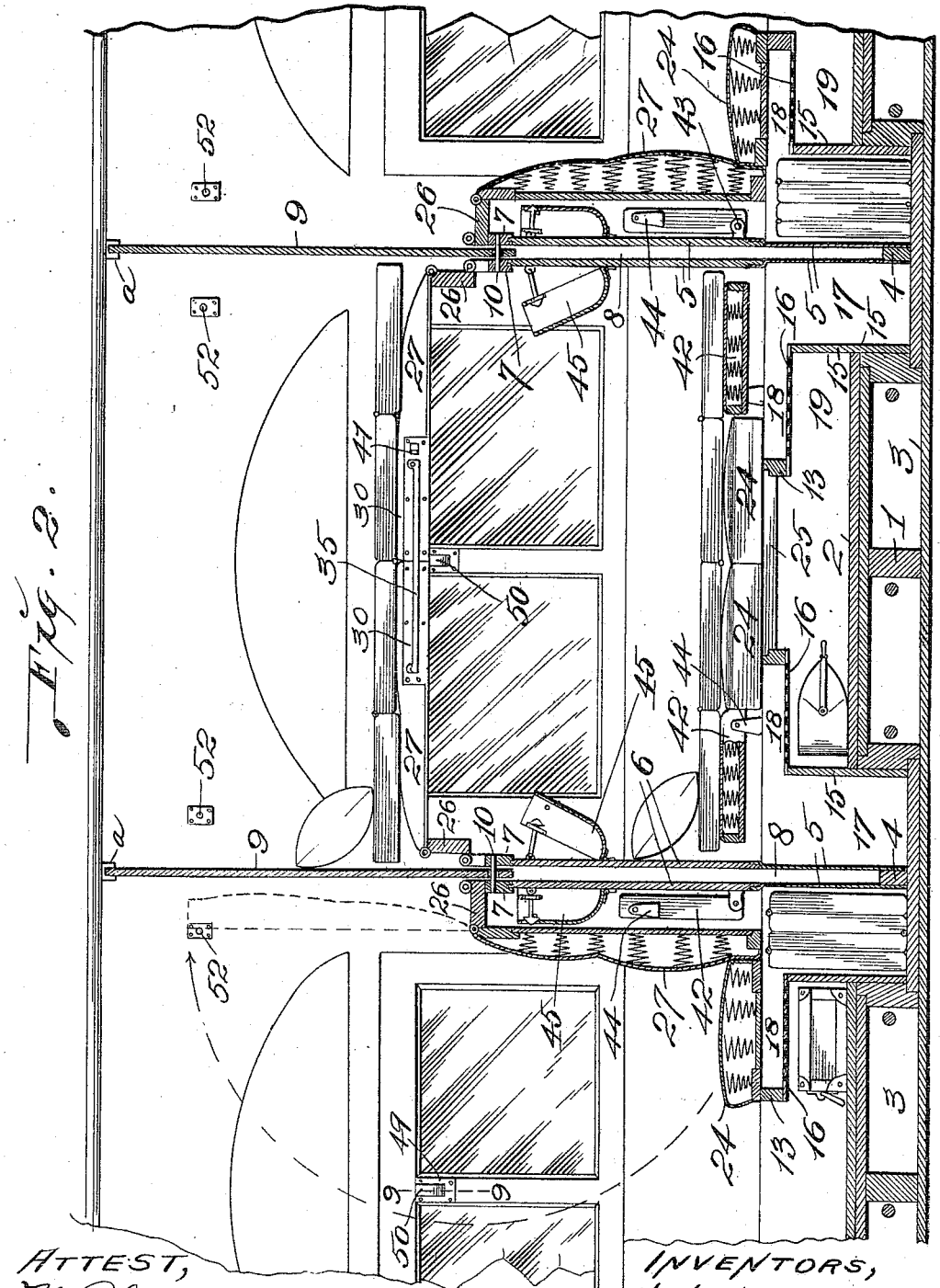

H. H. NIEMEYER, A. E. LEHMANN & A. SINSKEY.
SLEEPING CAR.
APPLICATION FILED AUG. 26, 1907.
964,540.
Patented July 19, 1910.
5 SHEETS—SHEET 4.
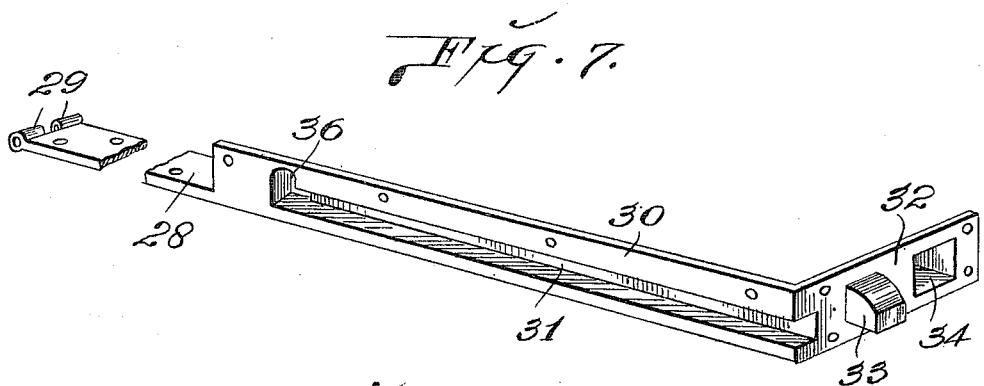
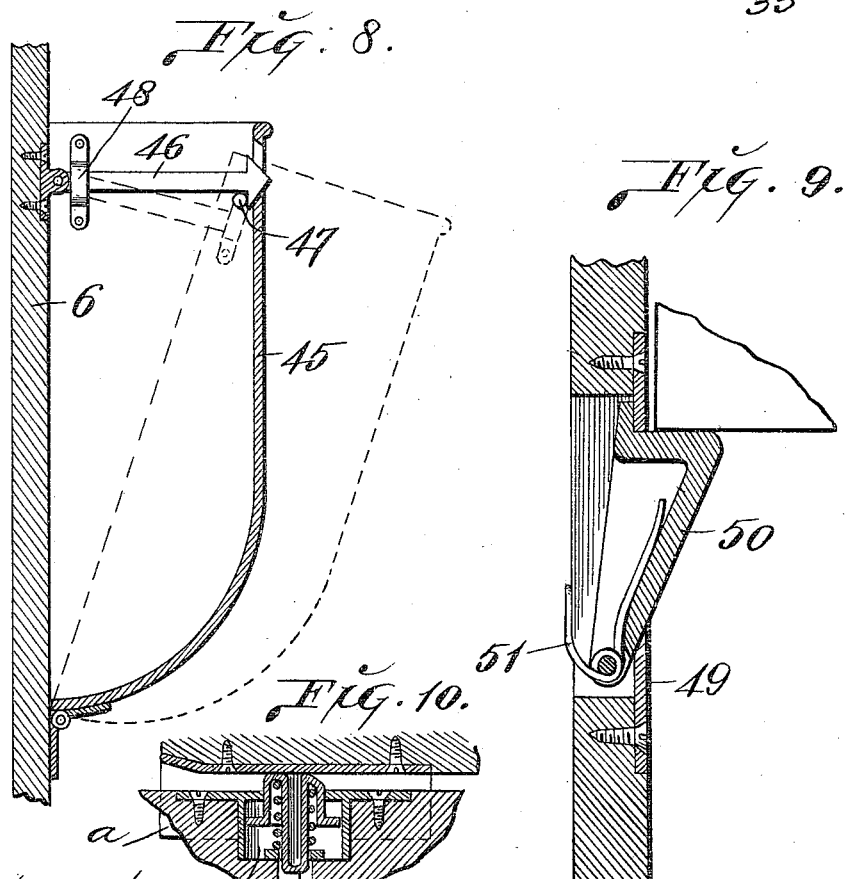

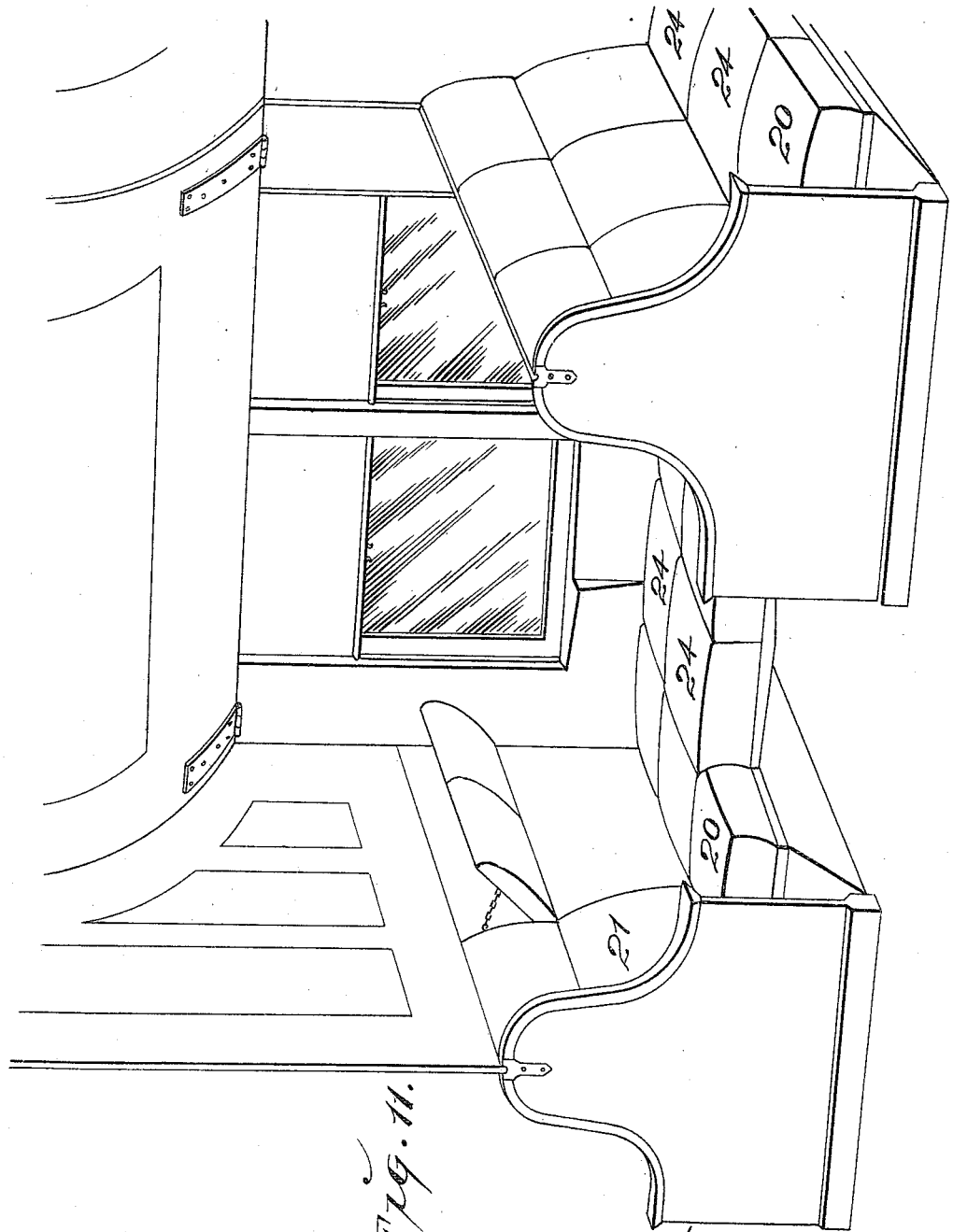

UNITED STATES PATENT OFFICE.

HERMAN H. NIEMEYER, ARTHUR E. LEHMANN, AND ADOLF SINSKEY, OF ST. CHARLES, MISSOURI.

SLEEPING-CAR.

964,540. Specification of Letters Patent. Patented July 19, 1910.

Application filed August 26, 1907. Serial No. 390,234.

*To all whom it may concern:*

Be it known that we, HERMAN H. NIEMEYER, ARTHUR E. LEHMANN, and ADOLF SINSKEY, citizens of the United States, and residents of St. Charles, Missouri, have invented certain new and useful Improvements in Sleeping-Cars, of which the following is a specification containing a full, clear, and exact description, reference being had to the accompanying drawings, forming a part thereof.

Our invention relates generally to sleeping cars, and particularly to an improved arrangement and construction of the berths of sleeping cars of the type shown in our patent application filed in the United States Patent Office October 13, 1907; Serial No. 338,878; and the principal object of our present invention is to so construct the berths as that greater convenience is offered the occupants of the berths than in sleeping cars of ordinary construction; and there being spaces formed beneath the seats and seat backs, which spaces receive baggage and the bedding used in connection with the berths.

A further object of our invention is to divide the seat cushions and seat back cushions transversely, in order that part of the seat and seat back may be utilized as a berth, and the remaining part utilized as a seat for the occupant of the berth.

To the above purposes, our invention consists in certain novel features of construction and arrangement of parts, which will be hereinafter more fully set forth, pointed out in the claims, and illustrated in the accompanying drawings, in which:—

Figure 1 is a perspective view of a compartment in a car of our improved construction, and showing the movable portions of the seats and seat backs in position to form the upper and lower berths, and ready to receive the bedding; Fig. 2 is a vertical section taken longitudinally through the center of a compartment in a car of our improved construction, and showing the berths made up in said compartment; Fig. 3 is an enlarged horizontal section taken approximately on the line 3—3 of Fig. 1; Fig. 4 is a perspective view of the end of a lock bar used for locking the members forming the base of the upper berth to one another; Fig. 5 is an enlarged vertical section taken on the line 5—5 of Fig. 1; Fig. 6 is a horizontal section taken through the upper portion of a compartment showing the upper berth, and the seats adjacent the lower berth; Fig. 7 is a perspective view of a combined hinge plate and lock bar housing such as is used on the members forming the bases of the upper berth; Fig. 8 is an enlarged vertical section taken through the center of a pocket which is hinged to the seat back frame, and normally occupies a position beneath the seat back cushion; Fig. 9 is an enlarged vertical section taken on the line 9—9 of Fig. 2; Fig. 10 is a detail section taken on the line 10—10 of Fig. 1; Fig. 11 is a perspective view of a compartment in a sleeping car of ordinary construction, and showing our improved arrangement of seats and seat back cushions therein.

In our improved car, the body thereof is of the usual construction, and the compartments are located on each side of the central aisle, and the seats of each compartment being arranged opposite one another in the ends of the compartment.

1 designates the usual transverse sills, arranged in the usual manner beneath the car floor 2, and fixed to the under sides of the sills is the sheathing 3, which acts as a noise deadener.

Fixed to the sheathing 3, midway between a pair of the sills 1 and at suitable distances apart, are the transversely disposed timbers 4; and fixed to each of these timbers is a pair of vertically disposed sheet metal plates 5, the upper ends of which are fixed in any suitable manner to a pair of vertically disposed panels 6, the upper ends of which are provided with transversely arranged rails 7.

The construction just described forms the seat back frames, and between the panels 6 is formed a narrow space 8, which is occupied by a panel 9, pivotally arranged upon a pin 10 passing through the rails 7, and which panel is adapted to be swung upward between the sides and top of the car to complete the compartments when the berths are made up.

When the panel 9 is swung upward, its top edge is engaged by an inverted U-shaped clip $a$, to prevent any lateral motion of the upper part of said panel; and operating vertically through a housing $b$ carried by the edge of the panel is a spring pressed plug or stop $c$ which, when the panel is swung upward, yieldingly engages the clip $a$, thus tending to rigidly maintain the panel in its upright position, and prevent any rattling thereof, and also compensating for any variation of the distance between the upper portion of the seat frame and the car ceiling. Fixed to the ends of the panels 6, adjacent the aisle, are the seat ends 11, and hinged to one of the ends of each pair is a vertically arranged door 12, which normally closes the space 8, and which is opened to allow the panel 9 to be swung from one position to another. Seat rails 13 extend from the side walls of the car toward the car aisle, and the inner ends of said rails are fixed to end rails 14 carried by the seat ends 11.

Vertically disposed panels 15 are arranged a short distance away from the panels 5, the lower portions of said panels 15 being fixed to certain of the sills 1, and the upper ends of said panels 15 being fixed to horizontally disposed perforated plates 16, the outer edges of which are fixed to the under sides of the seat rails 13. Thus rectangular spaces or compartments 17 are formed between the panels 5 and 15, above the sheathing 3, which spaces form compartments to receive the mattresses and bedding necessary to make up the berths of the car, and spaces 18 are formed above the perforated plate 16, which spaces form compartments to receive berth bedding.

The spaces 19 between the car floor and the perforated plate 16 form compartments in which may be located the traveler's baggage. Seat cushions 20 are arranged on top of the seat rails 13 and end rails 14, adjacent the seat ends 11, and positioned immediately above these cushions 20, against the panels 6, adjacent the seat ends 11, are seat back cushions 21. These cushions 20 and 21 occupy approximately one-third of the space between the seat ends 11 and the side wall of the car, and the remaining two-thirds of this space being occupied by the movable parts utilized in forming the bases of the upper and lower berths. By this arrangement, a rectangular space 22 is formed between the cushions 20, which space gives the occupant of the berth sufficient room to stand while dressing. If desired, this space 22 may be divided into two compartments by a curtain 23, (shown by dotted lines in Fig. 6,) which curtain is transversely arranged between the usual front curtains and the outer edges of the upper and lower berths.

Positioned immediately over the perforated plate 16, and with their front edges normally resting on the seat rails 13, are the movable seat cushions 24, which occupy the space between the seat cushions 20 and the side wall of the car, and said seat cushions being adapted to be shifted toward one another until their front edges meet when the lower berth is made up; and, when so positioned, the inner ends of said seat cushions rest on a transverse rail 25, detachably arranged on the seat rails 13; and bridging the space between said rails.

Hinged to the rails 7 are rails 26, and hinged to said rails are the upper ends of seat back cushions 27, which normally occupy vertical positions above the rear ends of the seat cushions 24, and in alinement with the seat back cushions 21. Fixed to the under sides of these seat back cushions 27, at the inner edges thereof, are plates 28, the outer ends of which terminate in loops 29 forming part of the hinges by means of which said cushions 27 are connected to the rails 26; and formed integral with the outer edges of the plates 28 are the vertically disposed plates 30, in which are formed longitudinally disposed pockets 31, and which plates 30 are fixed to the inner side faces of the cushions 27.

Formed integral with the end of each plate 28, and arranged at right angles thereto is a plate 32, which is fixed on the lower end of the corresponding cushion 27, and formed integral with each plate 32 is a lug 33; and there being a lug pocket 34 formed in said plate 32 adjacent the lug 33. The plates 32 are located on the meeting faces of the seat back cushions 27 when the same are swung into horizontal positions to form the base of the upper berth; and, when so positioned, the lugs 33 occupy the corresponding pockets 34 formed in the opposite plates, thus serving to rigidly hold the cushions 27 in their elevated positions.

A lock bar 35 is adapted to occupy the alined pockets 31 to rigidly lock the cushions 27 to one another when elevated, said lock bar being adapted to slide through an aperture 36 formed at the end of one of the pockets; and said bar, when not in use, occupying a position in a tube or trough 37 located in one of the cushions 27. The right hand end of this lock bar is provided with a hook 38, which engages an aperture 39 formed at the end of one of the pockets 31 when said bar is in use; and this end of the bar is also provided with a recess 40 which receives the end of a spring actuated locking bar 41.

Cushions 42 are hinged at 43 to the lower ends of the panels 6, which cushions normally occupy vertical positions behind the lower portions of the seat back cushions 27, and said cushions 42 being adapted to swing downward into horizontal planes when the cushions 27 are elevated and the seat cushions 24 are moved toward one another; and, when in said positions, the outer ends of said cushions 42 are supported by gravity legs 44 pivotally mounted on the ends of said cushions 42. When these cushions 42 occupy horizontal planes, their top surfaces are in approximate alinement with the top surfaces of the cushions 24, and thus a convenient base for the lower berth is formed.

Pockets 45, constructed of sheet metal, or analogous material, are hinged at their lower ends to the upper portions of the panels 6, immediately above the cushions 42, said pockets normally occupying the spaces between said panels 6 and the upper portions of the cushions 27.

Hooks 46 are hinged to the panels 6, adjacent the ends of these pockets 45, the outer ends of which hooks engage pins 47 to hold the pockets in upright or closed positions, and the outer ends of said hooks being engaged by stops 48 when the pockets are swung into open positions. These pockets, when closed, are designed to receive bedding or curtains; and, when open, the wearing apparel of the occupant of the lower berth.

Seated in the sides of the car, between the windows, are plates 49, and hinged to the rear sides thereof are blocks 50, which normally project through openings formed in the centers of said plates 49, and there being springs 51 bearing against the rear sides of said blocks. These blocks 50 are adapted to receive and support the outer corners of the seat back cushions 27 when the same are swung into horizontal positions. When only the lower berth is made up, the seat back cushions 27 are swung upward into vertical positions, (as shown by dotted lines in Fig. 2,) and are held in such position by spring catches 52 arranged in the upper portions of the sides of the cars, or in any suitable manner.

When a car of our improved construction is in use as a day coach, the panels 9 occupy the spaces 8, the cushions 42 and pockets 45 occupy vertical positions behind the seat back cushions 27, and the seat cushions 24 are positioned immediately over the spaces or compartments 18, in which bedding used in connection with the berths is stored. The mattresses used in connection with the berths are stored in the compartments 17, with the traveler's hand baggage occupying the spaces 17.

To make up the berths in one section, the doors 12 between the seat ends are opened, the panels 9 are swung upward against the side and ceiling of the car, and the spring pressed plugs or catches c engage in the clips a and rigidly maintain the panels in their elevated positions. The seat cushions 24 of the section being made up are now moved toward one another a sufficient distance to allow the seat back sections 27 to be swung upward into horizontal planes, and at the same time the rails 26 are swung into vertical planes and thus said seat back sections 27 occupy a horizontal plane a considerable distance above the seat back frames, thus giving the necessary space between the upper and lower berths. In moving the seat back cushions 27 into position, they are so manipulated as that the lugs 33 engage in the pockets 34, thus rigidly uniting the meeting ends of said cushions, and the lock bar 35 is now pulled outward from the tube or housing in which it is normally positioned, and is swung laterally into its seat in the alined recesses 31, with the hook 38 engaging in the aperture 39, and the locking bolt 41 engaging in the recess 40. This arrangement provides a very strong lock and brace for the front side of the upper berth, and the rear corners of the seat back sections forming said upper berth are supported by the block 50, which is automatically swung inward when said back sections are elevated. A rail 25 is now arranged between the seat rails 13, and the seat cushions 24 are now moved toward one another until their front edges meet, after which the cushions 42 are swung downward to form the end sections of the base of the lower berth. The mattresses, which have previously been removed from the compartments 17 are now positioned on the bases of the upper and lower berths, and the bedding which has been normally stored in the spaces 18 and pockets 45 is now arranged upon the mattresses. The usual curtains are now arranged in front of the section thus made up, and the berths of said section are now ready to be occupied. When it is desired to make up the lower berth only, the seat back cushions 27 are swung upward into vertical positions, (as shown by dotted lines in Fig. 2,) and are so held by engagement with the spring catches 52; and when this arrangement is carried out, the occupant of the lower berth has the convenience of the entire space within the compartment above said lower berth.

In Fig. 10 we have shown the seats and seat backs of a sleeping car of ordinary construction divided so that a two-thirds lower berth may be made up, thus leaving floor and seat space for the occupant of said lower berth.

By our improved construction, the occupant of a berth is provided with both floor space and seats while dressing or undressing, and convenient compartments are formed beneath the seats for the reception of the traveler's hand baggage, and for the mattresses and bedding utilized in connection with the berths.

The berths of our improved car are easily and quickly made up or taken down; and, if desired, a private compartment may be formed while the car is in use as a day coach, by merely elevating the panels 9 and arranging the usual curtains in front of the compartment.

If desired, the sections 21 of the seat backs may be hinged to the seat back frames in a similar manner as are the sections 27, and said sections may likewise be provided with the same interlocking means, in which event the sections 20 are made removable or portable. By hinging the sections 21 as above described, and providing the same with the same interlocking means, they may also be elevated and locked together; and when they are so elevated and locked together, a full width upper and lower berth can be formed.

We claim:—

1. A sleeping car, constructed with a series of seat frames, seat back cushions hinged to said frames, seat cushions loosely mounted on the seat frames, all of which cushions are transversely divided, said seat back cushions arranged to be moved upwardly to form cushioned bases for the upper berths and the seat cushions arranged to be moved toward each other to form cushioned bases for parts of the lower berths and separate means supported by the seat frames for supporting each of said seat cushions when drawn together.

2. A sleeping car, constructed with a series of seat frames arranged in pairs and oppositely faced, seat back cushions hinged to the backs of the frames, seat cushions loosely mounted on the seat portions of said frames, all of which cushions are divided transversely, said seat back cushions arranged to be moved upwardly to form cushioned bases for the upper berths and the seat cushions arranged to be moved toward each other to form cushion bases for parts of the lower berths and separate, removable means supported by the seat frames for supporting each of said seat cushions when drawn together.

3. A sleeping car constructed with a series of seat-back frames, seat cushions and seat-back cushions arranged on seat frames, which cushions are divided transversely, portions of which divided cushions are adapted to be swung upward into a horizontal plane to form the base of the lower berth, and which cushions when elevated occupy a plane wholly above the point of pivotal connection between said cushions and the seat-back frames, seat ends arranged at the inner end of each seat frame and there being compartments formed between the seat ends and the side of the car below the seats, and which compartments extend below the floor of the car.

4. A sleeping car, constructed with a series of seat frames, seat ends arranged at the inner end of each seat frame, sectional seat and seat back cushions arranged on the seat frames, and there being compartments formed between the seat ends and the side of the car below the sectional seat and seat back cushions, which compartments extend below the floor of the car.

5. A sleeping car, constructed with a series of seat frames, there being spaces formed between the backs of the seat frames, a panel arranged between the backs of each pair of seat frames and arranged to swing into and out of the space between said backs, sectional seat and seat back cushions arranged on the seat frames, certain of which sectional cushions are movable relative the remaining sections.

6. A sleeping car, constructed with a series of seat frames, there being spaces formed between the backs of the seat frames, a panel arranged between the backs of each pair of seat frames and arranged to swing into and out of the space between said backs, sectional seat and seat back cushions arranged on the seat frames, certain of which sectional cushions are movable relative the remaining sections, and are adapted to be moved into position to form the bases of the upper and lower berths.

7. A sleeping car, constructed with a series of seat frames arranged in pairs and oppositely faced, seat back cushions hinged to the backs of the frames, seat cushions loosely mounted on the seat portions of said frames, all of which cushions are divided transversely, said seat back cushions, from opposing seat frames, arranged to be moved upwardly to form separate cushioned bases for the upper berths and the seat cushions of opposing seat frames arranged to be moved toward each other to form separate cushioned bases for parts of the lower berths and separate, detachable means supported by the seat frames for supporting each of the seat cushions when drawn together.

8. A sleeping car, constructed with a series of seat frames arranged in pairs and oppositely faced, seat back cushions hinged to the backs of the frames, seat cushions loosely mounted on the seat portions of said frames, all of which cushions are divided transversely, said seat back cushions, from opposing seat frames, arranged to be moved upwardly to form separate cushioned bases for the upper berths and the seat cushions, of opposing seat frames, arranged to be moved toward each other to form separate cushioned bases for parts of the lower berths and separate removable means resting on the seat frames for supporting each of the seat cushions when moved toward each other to form the bases for the lower berths.

9. A sleeping car, constructed with a series of seat frames, seat and seat back cushions arranged on said frames, which cushions are divided transversely, the movable portions of the seat cushions being adapted to move into position to form the central portion of the lower berth, cushions arranged to form the end portions of the lower berth, the movable portions of the seat back cushions being arranged to swing into a horizontal plane to form the base of the upper berth, and a lock bar carried by one of the seat back cushions and arranged to engage the opposite seat back cushion when said cushions occupy horizontal positions.

10. A sleeping car, comprising a series of seat frames, seat ends arranged on said frames, there being transversely disposed compartments formed between the seat ends and the side of the car, which compartments extend below the floor of the car, seat and seat back cushions arranged on the seat frames, which cushions are divided transversely, certain of the sections formed by dividing being movable relative the remaining sections, and which movable sections are adapted to be moved into positions to form the bases of the upper and lower berths, and panels pivotally secured to the seat backs and adapted to swing upward against the car ceiling to form head-boards at the ends of the compartments between the seat frames.

11. A sleeping car, constructed with a series of seat frames, seat cushions arranged on said frames which cushions are divided transversely and portions of which divided cushions are movable relative the remaining portion in order to form a cushioned base for a part of the lower berth, rails hinged to the upper portions of the backs of the seat frames, seat back cushions carried by said hinged rails, which seat back cushions are adapted to be swung into horizontal planes to form the cushioned base of the upper berth and a locking bar carried by the meeting ends of the seat back cushions, which locking bar engages the opposite seat back cushions when said cushions are swung upward into a horizontal plane.

12. A sleeping car, constructed with a series of seat frames, seat cushions arranged on said frames, which cushions are divided transversely and portions of which divided cushions are movable relative the remaining portion in order to form a cushioned base for a part of the lower berth, rails hinged to the upper portion of the backs of the seat frames, seat back cushions carried by said hinged rails, which seat back cushions are divided transversely and portions of which seat back cushions are adapted to be swung into horizontal planes to form the cushioned base of an upper berth and means whereby said movable seat back cushions are rigidly locked to one another when elevated.

13. A sleeping car, constructed with a series of seat frames, seat cushions arranged on said frames, which cushions are divided transversely, and portions of which divided cushions are movable relative the remaining portion in order to form a part of the base of the lower berth; rails hinged to the upper portions of the backs of the seat frames, seat back cushions carried by said hinged rails, which seat back cushions are divided transversely and portions of said seat-back cushions are adapted to be swung into horizontal planes to form the base of an upper berth, and means carried by one of the movable seat back cushions and adapted to engage the opposite seat back cushion when elevated to lock the two cushions to one another against vertical, transverse, or longitudinal movement.

14. A sleeping car, constructed with a series of seat frames, seat cushions arranged on said frames, which cushions are divided transversely, and portions of which divided cushions are movable relative the remaining portion in order to form a part of the base of the lower berth; rails hinged to the upper portions of the backs of the seat frames, seat back cushions carried by said hinged rails, which seat-back cushions are divided transversely and the movable portions of which seat back cushions are adapted to be swung into horizontal planes to form the base of an upper berth, and a locking member carried by one of the movable seat back cushions and adapted to rigidly engage the opposite movable seat back cushion when said cushions are elevated to hold said cushions against movement one relative the other.

15. A sleeping car, constructed with a series of seat frames, seat and seat back cushions arranged on said frames, which cushions are divided transversely, and portions of said divided cushions being movable relative the remaining portions, rails connected to the upper ends of the movable seat back cushions, and which rails are hinged to the upper portions of the seat back frames.

16. A sleeping car, constructed with a series of seat frames, seat and seat back cushions arranged on said frames, which cushions are divided transversely, and portions of said divided cushions being movable relative the remaining portions, rails connected to the upper ends of the movable seat back cushions, which rails are hinged to the upper portions of the seat back frames, and means whereby the movable seat back cushions are locked to one another when elevated, to prevent movement in any direction of one seat back cushion relative the other.

17. A sleeping car, constructed with a series of seat frames arranged in pairs and oppositely faced, seat back cushions hinged to the backs of the frames, seat cushions loosely mounted on the seat portions of said frames, all of which cushions are divided transversely, said seat back cushions, from opposing seat frames, arranged to be moved upwardly to form separate cushioned bases for the upper berths and the seat cushions, of opposing seat frames, arranged to be moved toward each other to form separate cushioned bases for parts of the lower berths and removable rails resting on the opposing seat frames for supporting the seat cushions when moved toward each other to form the bases of the lower berths.

18. A sleeping car, constructed with a series of seat frames arranged in pairs and oppositely faced, seat back cushions hinged to the backs of the frames, seat cushions loosely mounted on the seat portions of said frames, all of which cushions are divided transversely, said seat back cushions, from opposing seat frames, arranged to be moved upwardly to form separate cushioned bases for the upper berths, interlocking devices carried by the seat back cushions for holding them elevated and the seat cushions, of opposing seat frames, arranged to be moved toward each other to form separate cushioned bases for parts of the lower berths and removable rails supported from the seat frames for supporting the seat cushions when moved toward each other to form the lower berths.

19. In a sleeping car, a seat back frame, a panel pivotally carried by said frame, and a yielding stop carried by the upper portion of said panel.

20. A sleeping car, constructed with a series of seat frames, seat cushions and seat back cushions arranged on said frames, which cushions are divided transversely, and portions of which cushions are movable to form the base of upper and lower berths, and a panel connected to each seat frame and adapted to move upward to form a partition above the seat frame.

21. A sleeping car, constructed with a series of seat frames, seat cushions and seat back cushions arranged on said frames, which cushions are divided transversely, and portions of which cushions are movable to form the base of upper and lower berths, a a panel connected to each seat frame and adapted to move upward to form a partition above the seat frame, and a yielding stop carried by the upper portion of the panel.

In testimony whereof, we have signed our names to this specification, in presence of two subscribing witnesses.

HERMAN H. NIEMEYER.
ARTHUR E. LEHMANN.
ADOLF SINSKEY.

Witnesses:
E. E. LONGAN,
M. P. SMITH.